US008668148B2

(12) United States Patent
Gronau et al.

(10) Patent No.: US 8,668,148 B2
(45) Date of Patent: Mar. 11, 2014

(54) RFID CHIP TRAY

(75) Inventors: Gregory S. Gronau, Las Vegas, NV (US); Emmanuel Gelinotte, Savigny les Beaune (FR); Francisco Javier Moreno, Yuma, AZ (US); Justin Woodard, Las Vegas, NV (US)

(73) Assignee: Gaming Partners International Corporation, Las Vegas, NV (US)

( * ) Notice: Subject to any disclaimer, the term of this patent is extended or adjusted under 35 U.S.C. 154(b) by 193 days.

(21) Appl. No.: 13/282,715

(22) Filed: Oct. 27, 2011

(65) Prior Publication Data

US 2012/0241344 A1 Sep. 27, 2012

Related U.S. Application Data

(60) Provisional application No. 61/407,407, filed on Oct. 27, 2010.

(51) Int. Cl.
*G06K 7/10* (2006.01)
(52) U.S. Cl.
USPC .......................... 235/451; 206/315.1; 206/445
(58) Field of Classification Search
USPC .................................. 235/451; 206/315.1, 445
See application file for complete search history.

(56) References Cited

U.S. PATENT DOCUMENTS

| 4,123,978 A | 11/1978 | Lentini |
| 4,782,619 A | 11/1988 | Richard |
| 2002/0096827 A1* | 7/2002 | Markowiak ................ 273/138.1 |
| 2003/0162489 A1 | 8/2003 | Korsen |
| 2005/0040229 A1 | 2/2005 | Andrews et al. |
| 2007/0026949 A1 | 2/2007 | Charlier et al. |
| 2007/0293303 A1 | 12/2007 | Shayesteh |
| 2010/0180646 A1 | 7/2010 | Mazingo |

OTHER PUBLICATIONS

International Search Report and Written Opinion dated Feb. 27, 2012.

* cited by examiner

*Primary Examiner* — Allyson Trail
(74) *Attorney, Agent, or Firm* — Baker & Hostetler LLP

(57) ABSTRACT

The invention generally pertains to a chip tray for storing casino currency. By way of example, one chip tray is a dual chip tray having a lower housing assembly having an interior configured for receiving at least one removable chip tray for holding gaming currency. A top tray sub assembly is hinged relative to the lower housing assembly to pivot between a closed position and an open position. A chip tray lid is provided to cover the lower housing assembly in a covered position. In another example, RFID antennas are positioned within the lower housing assembly and the top tray sub assembly. The RFID antennas are configured to read and communicate with RFID-enabled gaming currency in the lower housing assembly and the top tray sub assembly.

8 Claims, 8 Drawing Sheets

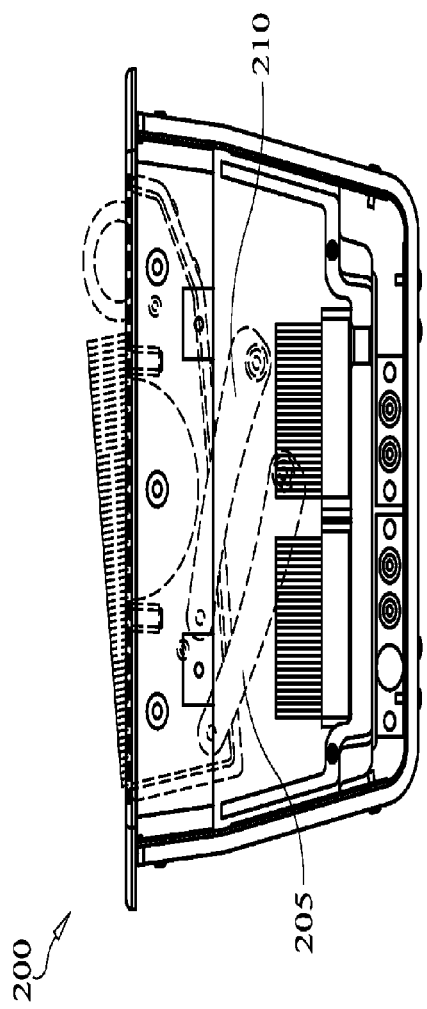
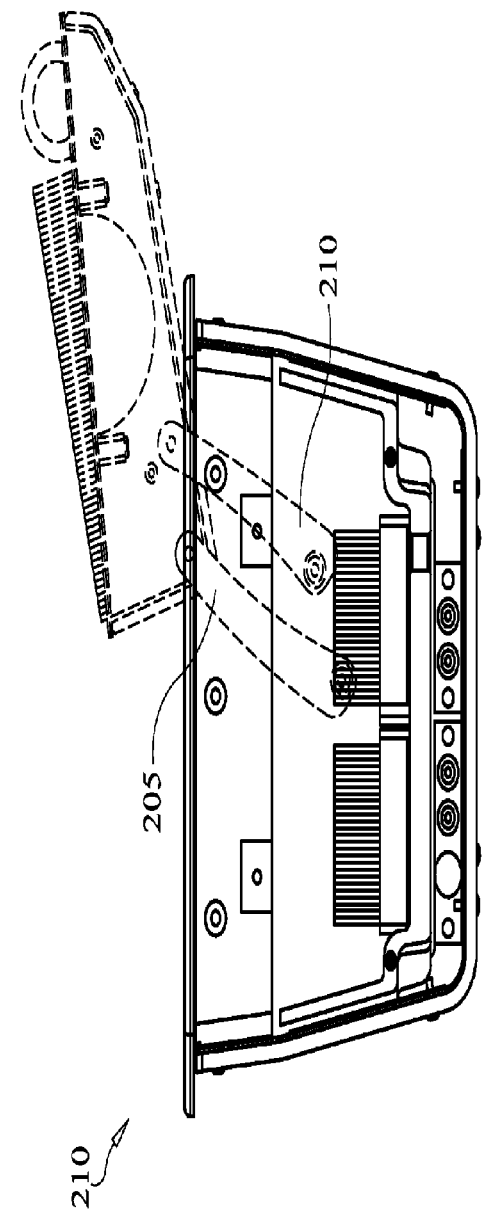

RFID CHIP TRAY

FIELD OF THE INVENTION

The present invention is directed to chip trays for storing gaming currency. More specifically, the present invention is directed to a low or high frequency single or dual chip tray that communicates with the memory of RFID-enabled casino currency to provide real-time chip counting and movement.

BACKGROUND INFORMATION

RFID microchips installed in gaming chips, plaques or jetons (i.e., gaming currency) provide a secure and reliable way to track and record the chip's movement throughout a casino. Because each chip has a unique tag that is encoded with the chip's monetary value, it can be instantly identified and validated when it comes in contact with an RFID reader. This makes RFID chips an ideal way to improve the accuracy of chip counting and cage inventory procedures while also providing a level of currency security that is practically impossible to breach. Using an RFID chip tray or float reader, a casino may automate and perfect its chip counting procedures, enabling its staff and pit supervisors to focus on other tasks.

BRIEF DESCRIPTION OF THE FIGURES

FIG. 8 illustrates a side view of the dual chip tray in the closed position; and FIG. 9 illustrates a side view of the dual chip tray in the open position.

BRIEF DESCRIPTION

Figure 1:
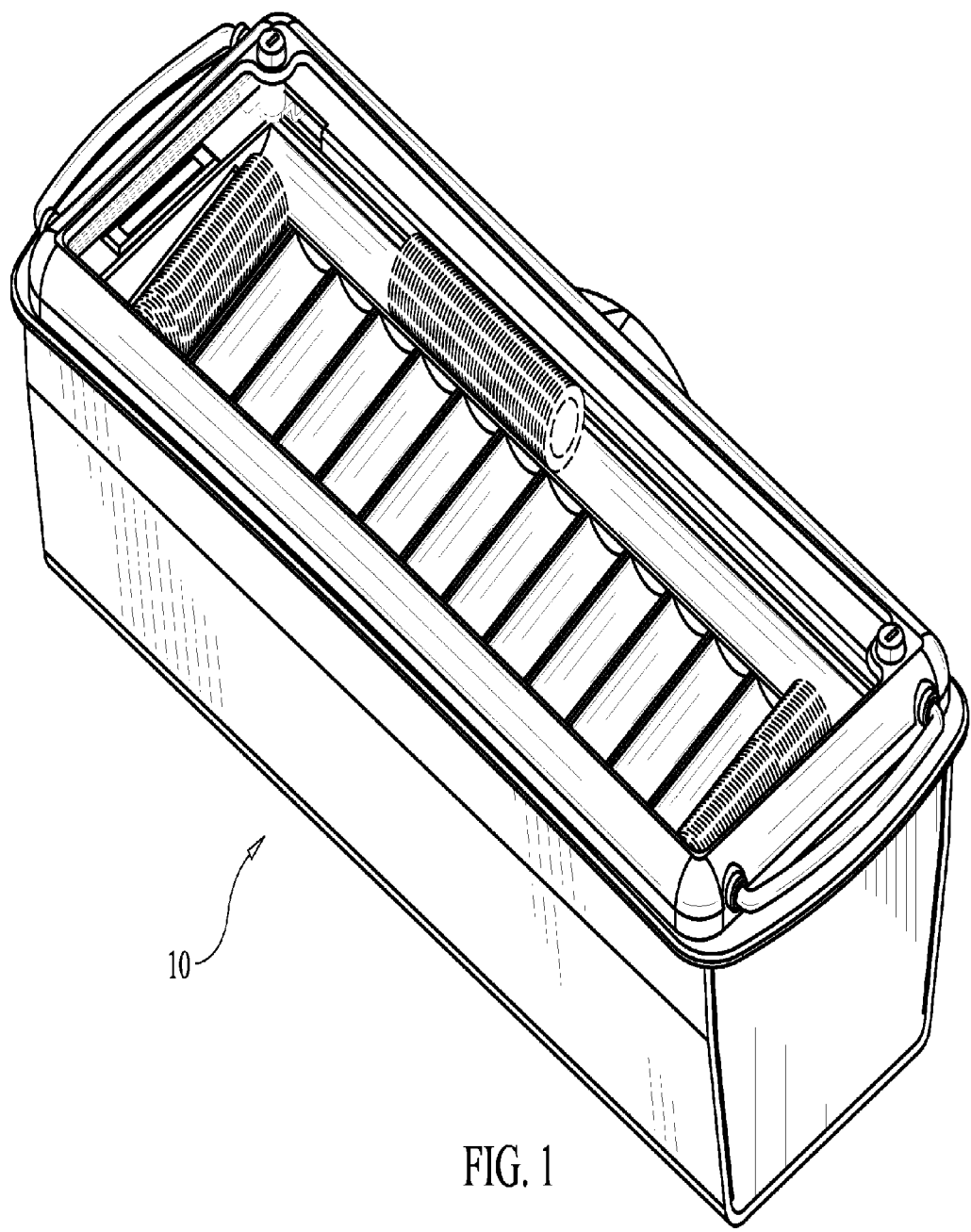
FIG. 1 is a perspective view of an embodiment of an RFID chip tray in accordance with one aspect of the present invention.

FIG. 1 illustrates one embodiment of an RFID chip tray 10 in accordance with one aspect of the present invention. RFID chip tray 10 is built to be transportable and used in several different ways within a gaming environment. In operation, RFID chip tray 10 offers authentication of RFID chips including ownership, value, and the like. RFID chip tray 10 is configured to authenticate RFID chips starting with a single chip up to several hundred chips in single and dual trays. RFID chip tray 10 may operate at both low and high frequencies, as those terms are known and understood in the gaming industry.

Figure 2:
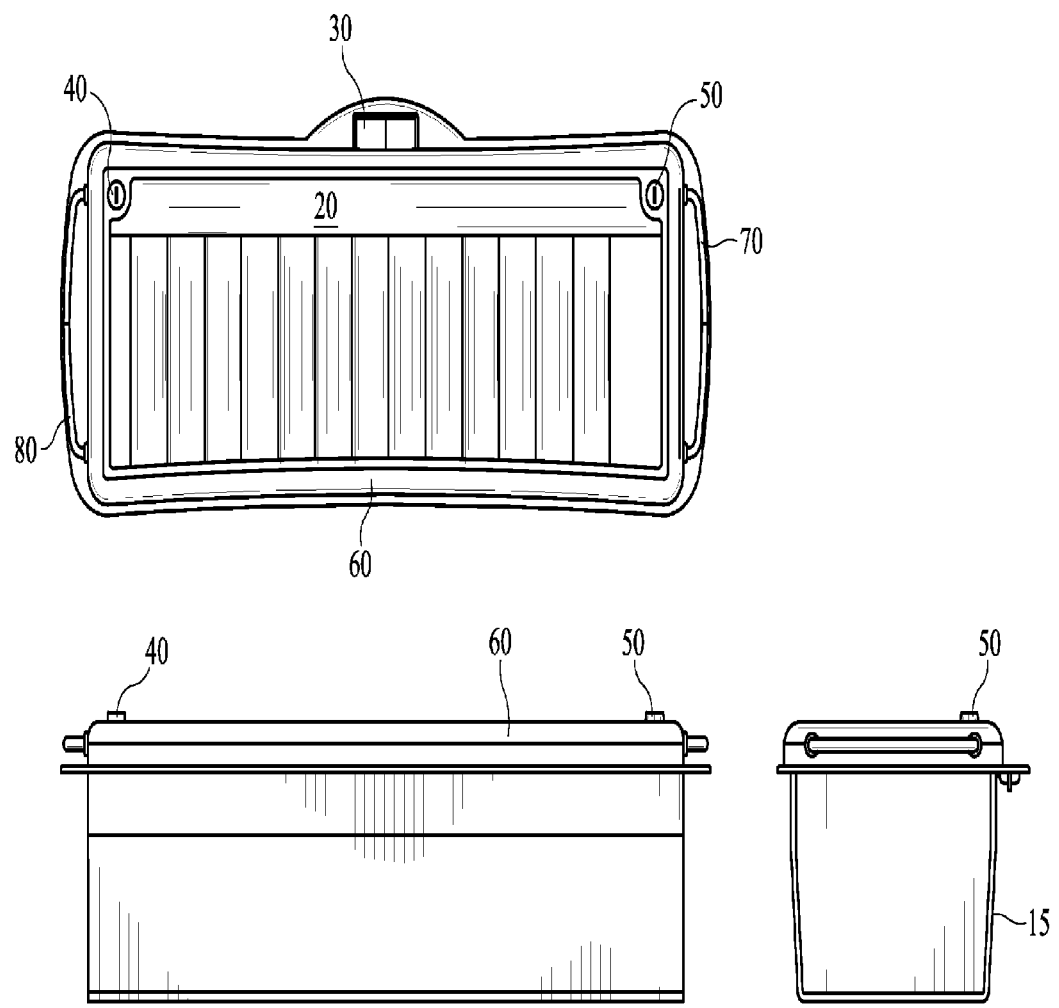
FIG. 2 is a top, front, and side view of an embodiment of the RFID chip tray of FIG. 1 showing the housing, molded top, Techart reader (optional) and locks.

FIG. 2 shows the various components of the RFID chip tray 10. In the illustrated embodiment, RFID chip tray 10 is generally comprised of a chip tray lower housing or assembly 15 manufactured of sheet metal in the illustrated embodiment, a single chip tube 20, a molded chip tray top 60 having an acrylic window 65, a plurality of handles 70 and 80 coupled to the lower assembly 15, a Techart reader 30, and a plurality of locking mechanisms 40 and 50. In the illustrated embodiment, the RFID chip tray 10 is configured to be driven by an RFID reader that is typically a Magellan Multiple Antenna Reader System (MARS-24) RFID reader designed to verify, inventory, monitor and control RFID chips having the ability to identify, read and write reliably to many hundreds of tags a second, however, as one of ordinary skill in the art will recognize, any suitable RFID reader may be used with the design of the RFID chip tray 10 without departing from the scope and spirit of the present invention. Also, a wireless reader is contemplated within the scope of the illustrated embodiment.

RFID chip tray 10 is shown as having a 15 rack chip tube 20, however, since the RFID chip tray 10 is intended to be modular to assist in its manufacture, the 15 rack chip tube may come in any variety of numbers, such as 10, 12, and 14 to name a few. Also, chip tube 20 is illustrated as a single tray, but a dual tray system is contemplated within the scope of the present invention. In addition, the chip tubes in the illustrated example are shown as only configured to hold circular gaming chips, however, one of ordinary skill in the art will recognize that the tubes may be configured to accommodate plaques, chips and other various shaped gaming chips.

RFID chip tray 10 is designed to fit within a gaming table and provides real-time chip counting and movement tracking for the tray and the contents therein. RFID chip tray 10 is also configured to provide continuous tracking of the tray activity, such as lid opening and closing and lid locking and unlocking.

Figure 3:
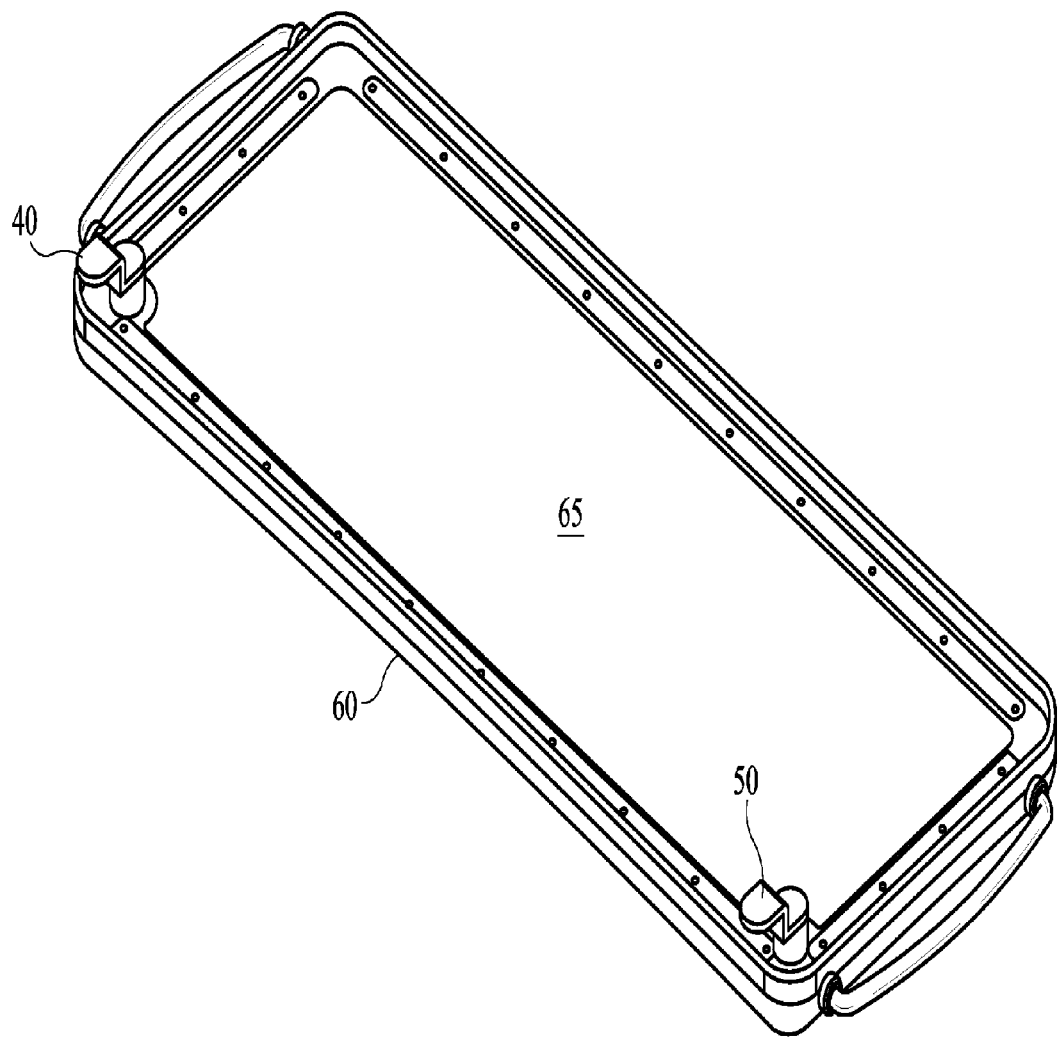
FIG. 3 is a perspective view of the top and an exploded view of top and locks of the RFID chip tray of FIG. 1.

FIG. 3 illustrates the molded chip tray top 60 of RFID chip tray 10 in greater detail. In operation, locking mechanisms 40, 50 engage the chip tray housing 15. In the illustrated embodiment, a plurality of security sensors (not shown) is provided to monitor the molded chip tray top 60, locking mechanisms 40, 50 and movements in or around the RFID chip tray 10.

Figure 4:
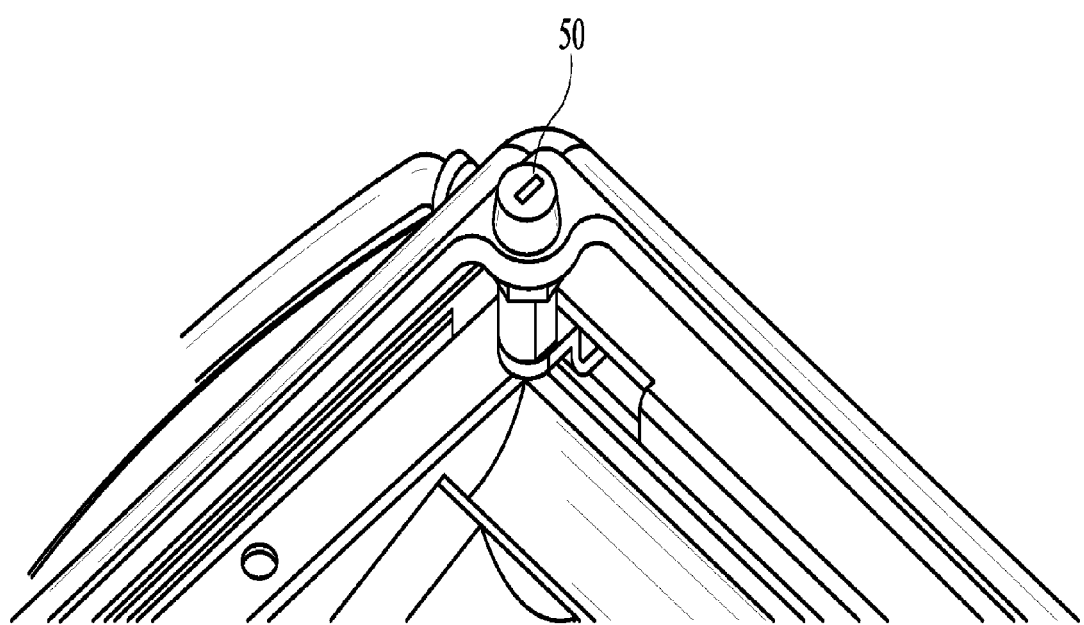
FIG. 4 is an exploded view of one exemplary lock of the RFID chip tray of FIG. 1.

FIG. 4 shows the lock assembly 50 in a locked position, specifically illustrating how the lock holds on to the lower tray assembly 15. While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

Figure 5:
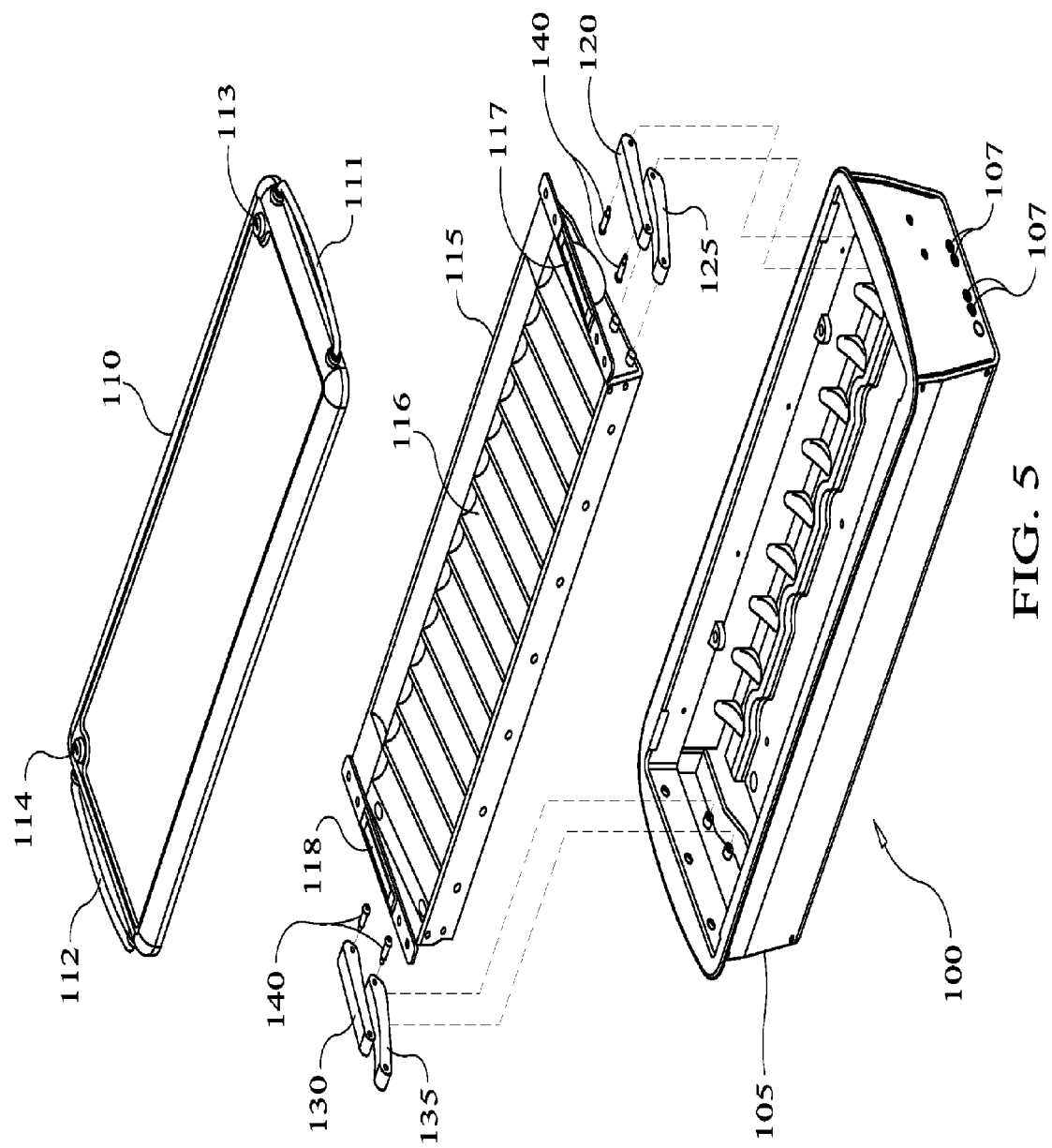
FIG. 5 is an exploded view of a dual chip tray for storing gaming currency.

FIG. 5 illustrates an exploded view of a dual chip tray 100 in accordance with one aspect of the present invention. In the illustrated embodiment, dual chip tray 100 comprises a lower housing assembly 105, a chip tray lid 110 and a top tray sub assembly 115. The lower housing assembly 105 has an interior 106 for accommodating stacks, rows or chip trays of casino currency. Lower housing assembly is also provided with at least one RFID antenna (not shown) for communicating with RFID-enabled casino currency located within the interior 106.

As shown, top tray sub assembly 115 comprises one or more columnar storage sections 116 for holding and storing casino currency. In the illustrated example, the columnar storage sections 116 are configured for receiving gaming chips, however, one of ordinary skill in the art can appreciate that the storage sections 116 may be configured for receiving plaques or jetons as well. Top tray sub assembly 115 is also provided with at least one RFID antenna (not shown) for communicating with RFID-enabled casino currency located within the storage sections 116.

Top tray sub assembly 115 is hinged relative to the lower housing assembly 105 so as to pivot between a first (closed) position and a second (open) position. As shown in the illustrated embodiment, the top tray sub assembly 115 is pivotally connected to the lower housing assembly 105 using a plurality of links 120, 125, 130, 135. On a first side of the dual chip tray 100, top tray sub assembly 115 is pivotally connected to the lower housing assembly 105 by means of a plurality of elongated links 120, 125. A first end of elongated links 120, 125 is coupled to the top tray sub assembly 115 and the other end of elongated links 120, 125 is coupled to the lower housing assembly 105. On a second side of the dual chip tray 100, top tray sub assembly 115 is pivotally connected to the lower housing assembly 105 by means of a plurality of elongated links 130, 135. A first end of elongated links 130, 135 is coupled to the top tray sub assembly 115 and a second end of elongated links 130, 135 is coupled to the lower housing assembly. The elongated links are secured to top tray sub assembly 115 and lower housing assembly 105 using a plurality of securing means 140. Securing means 140 may be a bolt, screw or any other sufficient fastening mechanism. Top tray sub assembly is provided with a plurality of tray handles 117, 118 for moving the top tray sub assembly between the closed position and the open position.

A plurality of RFID connections 107 is provided within the exterior wall of the lower housing assembly 105. The RFID connectors 107 are configured to be coupled to the RFID antennas in both the lower housing assembly and the top tray assembly and also coupled to an RFID reader such that the RFID reader may communicate with the plurality of antennas and the RFID reader may determine both the number and value of the RFID-enabled gaming currency located in the lower housing assembly and the top tray sub assembly.

In the illustrated embodiment, the RFID chip tray 100 is configured to be driven by an RFID reader that is typically a Magellan Multiple Antenna Reader System (MARS-24) RFID reader designed to verify, inventory, monitor and control RFID chips having the ability to identify, read and write reliably to many hundreds of tags a second, however, as one of ordinary skill in the art will recognize, any suitable RFID reader may be used with the design of the RFID chip tray 100 without departing from the scope and spirit of the present invention. Also, a wireless reader is contemplated within the scope of the illustrated embodiment.

In the closed position, the chip tray lid 110 is sized to fit over the lower housing assembly 105 and lock into place with a secure locking mechanism. In the illustrated example, the locking mechanism is a dual lock system having a first lock 113 and a second lock 114. In addition, the chip tray lid has a plurality of handles 111, 112 for transporting the dual chip tray 100 both to and from a table game for use and storage. In operation, locking mechanisms 113, 114 engage the chip tray housing 105. In the illustrated embodiment, a plurality of security sensors (not shown) is provided to monitor the molded chip tray top 110, the locking and unlocking of locking mechanisms 113, 114 and movements in or around the dual chip tray 100.

Figure 6:
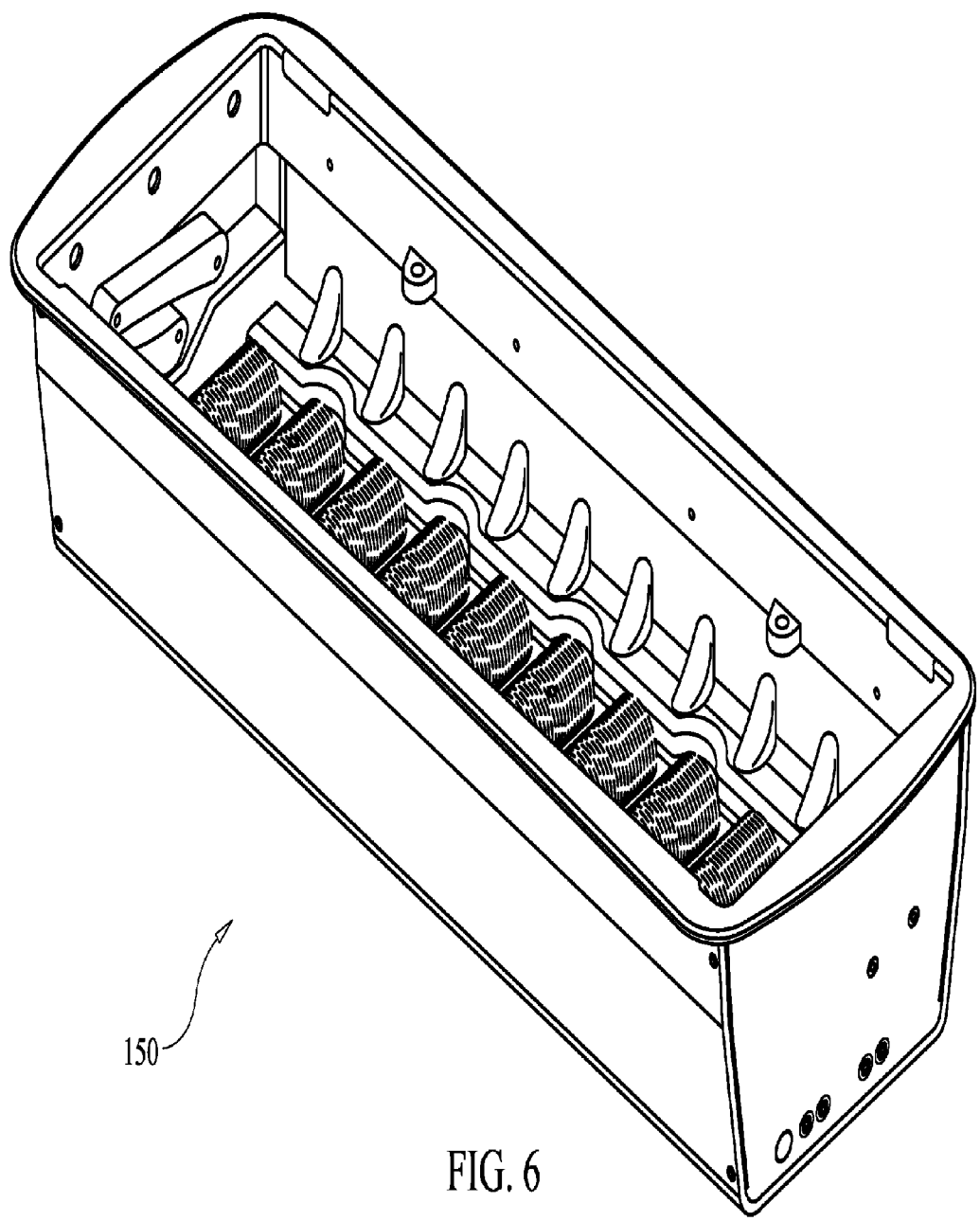
FIG. 6 illustrates the lower housing assembly of the dual chip tray with gaming currency within the interior.
Figure 7:
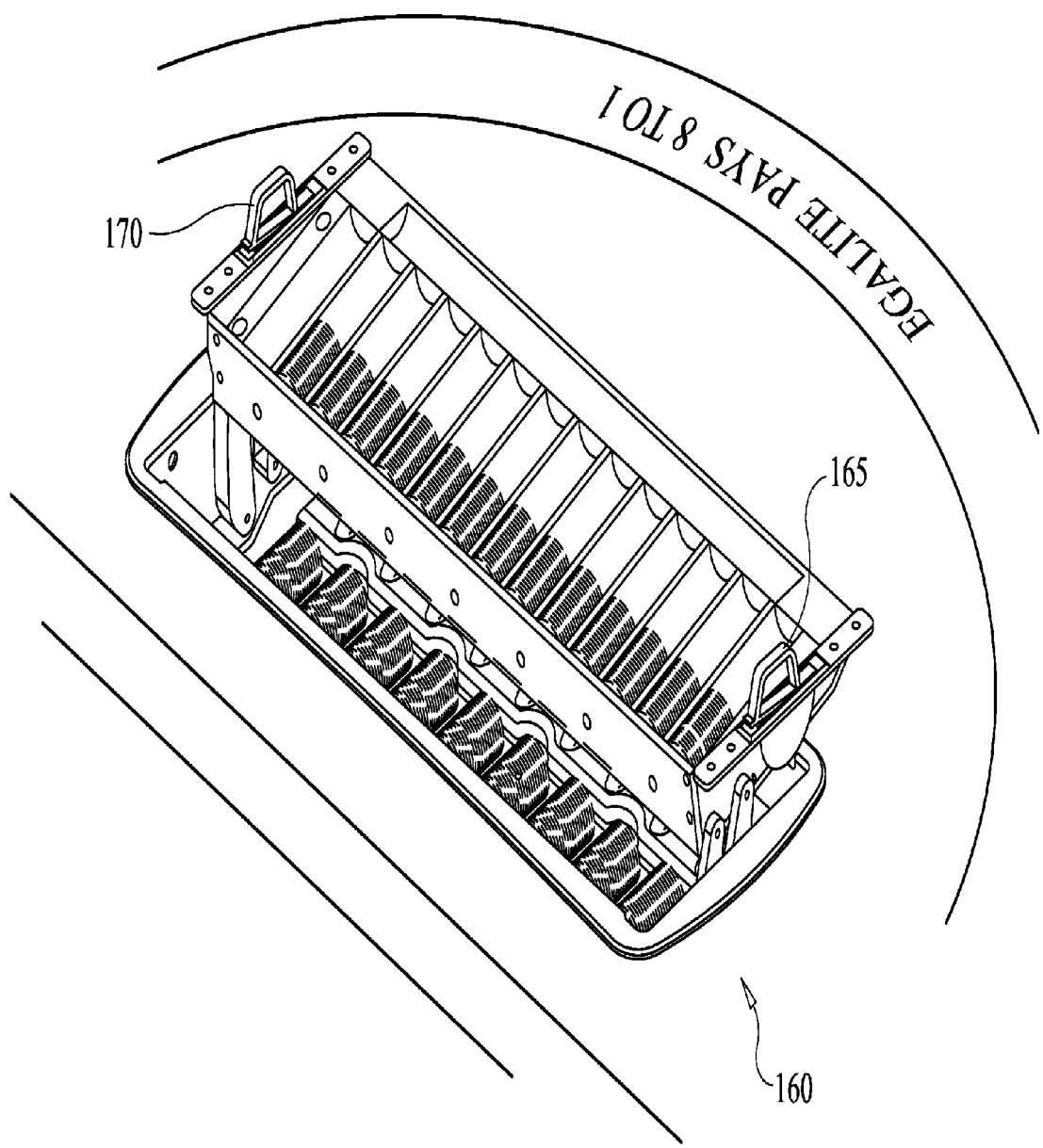
FIG. 7 shows the dual chip tray in operation and in the open position with gaming currency in the top tray assembly and in chip trays within the interior of the lower housing assembly.

FIG. 6 illustrate the lower housing assembly 150 with the top tray sub assembly removed. In the illustrated example, casino currency is located within the interior of the lower housing assembly 150. In actual use, the casino currency may be stacked in rows as shown, or it may be stored in chip trays as shown in FIG. 7. Continuing, FIG. 7 shows the dual chip tray 160 in operation, specifically, where the top tray sub assembly is in the second or open position relative to the lower housing assembly. As shown, in the open position, casino currency in both the top tray sub assembly and the lower housing assembly is accessible by a dealer, pit boss or other casino employee. Top tray sub assembly is provided with a plurality of tray handles 160, 165 for moving the top tray sub assembly between the closed position and the open position.

FIGS. 8 and 9 illustrate the operation of the dual chip tray between a closed position (FIG. 8) and open position (FIG. 9). In operation, in the closed position illustrated in FIG. 8, the top tray sub assembly is contained substantially within the interior of the lower housing assembly and the elongated links 205, 210 are in a first position. When the dual chip tray 100 is in the closed position 200, and the top tray sub assembly is contained substantially within the interior of the lower housing assembly, the chip tray lid may be placed in the covered position. In the open position 215 illustrated in FIG. 9, the elongated links 205, 210 move to a second position and the top tray sub assembly is configured to be at least partially outside of the interior of the lower housing assembly. In the open position, the gaming currency in both the lower housing assembly and the top tray sub assembly is accessible by a dealer, pit boss or other casino employee.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

While the invention has been particularly shown and described with reference to various embodiments thereof, it will be understood by those skilled in the art that various other changes in the form and details may be made without departing from the spirit and scope of the invention.

We claim:

1. A dual chip tray for storing gaming currency, said tray comprising:

a lower housing assembly having an interior configured for receiving at least one removable chip tray for holding gaming currency;

a chip tray lid configured to cover said lower housing assembly in a covered position;

a top tray sub assembly hinged relative to the lower housing assembly, said top tray assembly configured to pivot between a first position wherein the top tray assembly is contained substantially within the interior of the lower housing assembly and wherein the chip tray lid may be placed in the covered position and a second position wherein the top tray assembly is configured to be at least partially outside of the interior of said lower housing assembly and the chip tray lid is placed in an open position and wherein the gaming currency in both the lower housing assembly and the top tray assembly is accessible; and a plurality of RFID antennas positioned within the lower housing assembly and the top tray sub assembly, the RFID antennas configured to read and communicate with RFID-enabled gaming currency in the lower housing assembly and the top tray sub assembly.

2. The dual chip tray of claim 1, further comprising a plurality of RFID connectors, the RFID connectors coupled to the plurality of RFID antennas, the RFID connectors configured to be coupled to an RFID reader such that said RFID reader may communicate with said plurality of antennas to determine both the number and value of the gaming currency located in the lower housing assembly and the top tray sub assembly.

3. The dual chip tray of claim 1, further comprising a locking mechanism for securing the chip tray lid to the lower housing assembly.

4. The dual chip tray of claim 3, wherein said locking mechanism further comprises a dual lock system.

5. The dual chip tray of claim 3, further comprising a plurality of security sensors within the interior of said lower housing assembly for detecting movement of the chip tray lid, the locking mechanism, and the dual chip tray.

6. A modular RFID chip tray for storing gaming currency, said chip tray comprising:
 a chip tray housing;
 a lower tray assembly;
 a chip tray lid configured to cover said lower tray assembly in a closed position;
 a removable chip tube configured to be placed within the chip tray housing and configured to hold gaming currency having a plurality of RFID tags associated therewith;
 a plurality of RFID antennas positioned within the lower tray assembly, the RFID antennas configured to read and communicate with gaming currency in the removable chip tube;
 a plurality of chip tray locks attached to the chip tray lid and configured to move between a locked position and an unlocked position; and
 a plurality of RFID connectors, the RFID connectors coupled to the plurality of RFID antennas, the RFID connectors configured to be coupled to an RFID reader such that said RFID reader may communicate with said plurality of antennas to determine both the number and value of the gaming currency located in the removable chip tube.

7. The dual chip tray of claim 6, further comprising a plurality of security sensors within the interior of said lower tray assembly for detecting movement of the chip tray lid, the plurality of chip tray locks, and the chip tray.

8. A method of providing a dual chip tray for storing gaming currency, said method comprising:
 providing a lower housing assembly having an interior configured for receiving at least one removable chip tray for holding gaming currency;
 providing a chip tray lid configured to cover said lower housing assembly in a covered position;
 providing a top tray sub assembly hinged relative to the lower housing assembly, said top tray assembly configured to pivot between a first position wherein the top tray assembly is contained substantially within the interior of the lower housing assembly and wherein the chip tray lid may be placed in the covered position and an second position wherein the top tray assembly is configured to be at least partially outside of the interior of said lower housing assembly and wherein the gaming currency in both the lower housing assembly and the top tray assembly is accessible; and
 providing a plurality of RFID antennas positioned within the lower housing assembly and the top tray sub assembly, the RFID antennas configured to read and communicate with RFID-enabled gaming currency in the lower housing assembly and the top tray sub assembly.

\* \* \* \* \*